H. S. DICKINSON.
WHEEL PLOW.
APPLICATION FILED AUG. 2, 1917. RENEWED MAR. 29, 1919.

1,316,698.

Patented Sept. 23, 1919.
3 SHEETS—SHEET 1.

Inventor
H. S. Dickinson
By his Attorneys
Rogers, Kennedy & Campbell

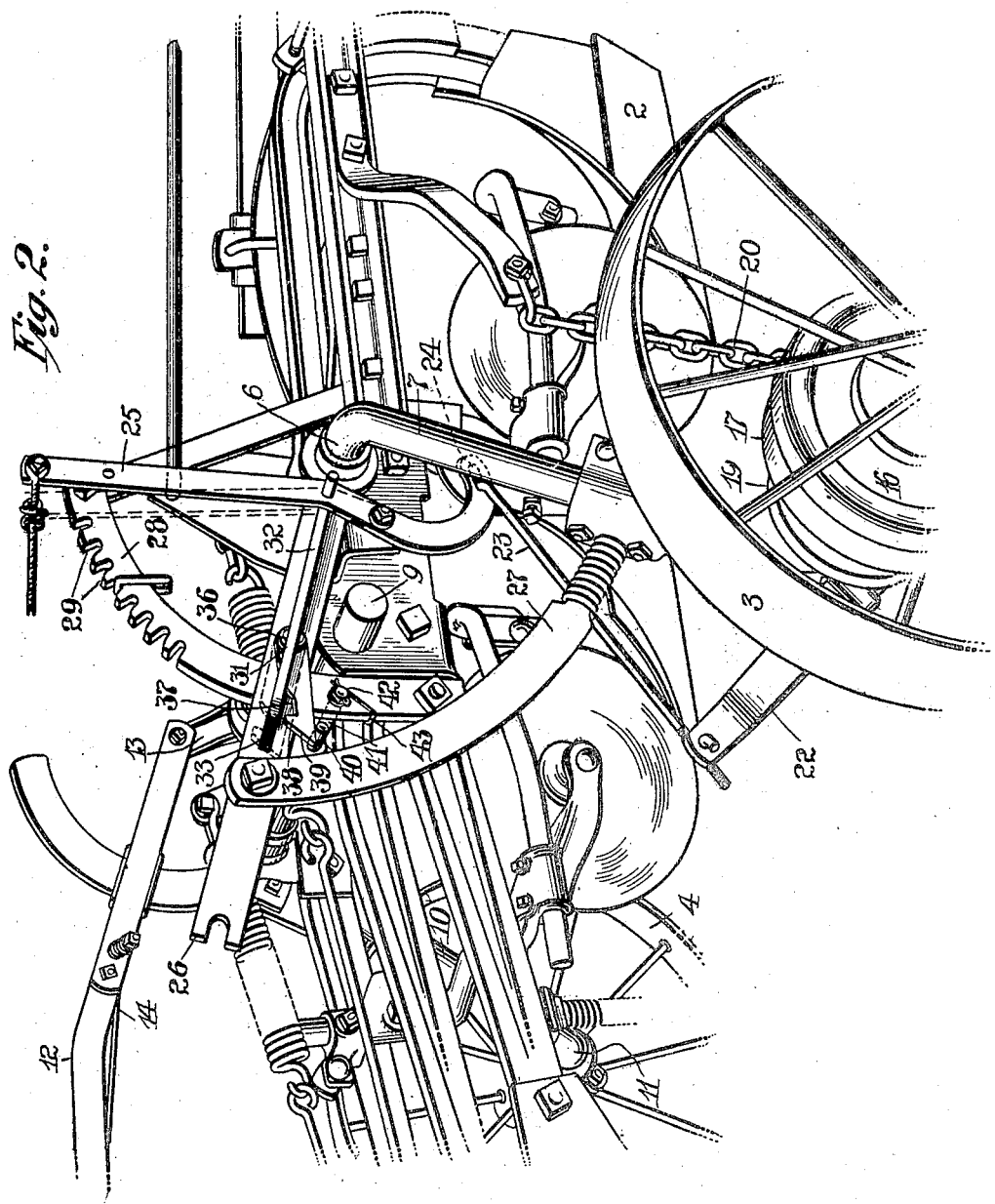

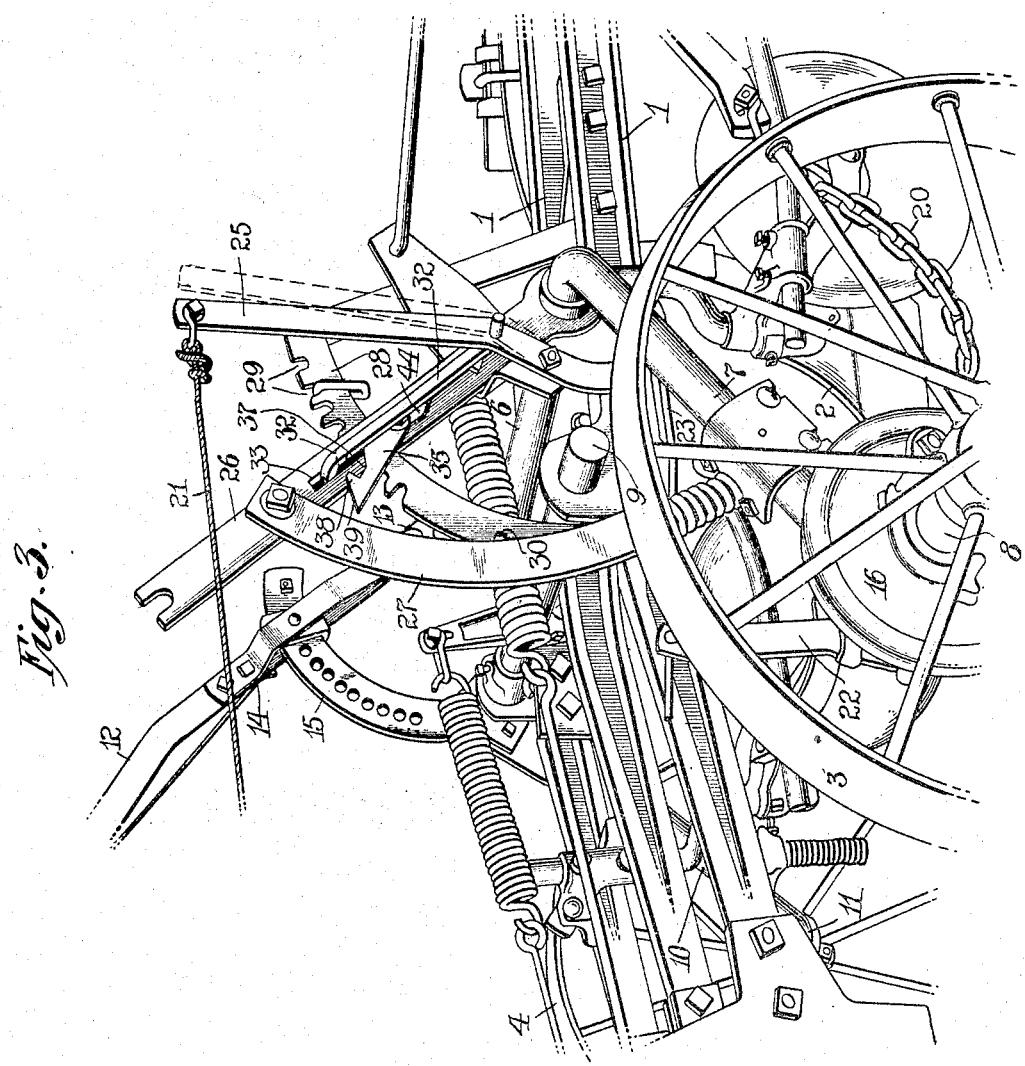

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

WHEEL-PLOW.

1,316,698.        Specification of Letters Patent.     Patented Sept. 23, 1919.

Application filed August 2, 1917, Serial No. 184,070. Renewed March 29, 1919. Serial No. 286,076.

*To all whom it may concern:*

Be it known that I, HARRY S. DICKINSON, a citizen of the United States, residing at Moline, in the county of Rock Island and State of Illinois, have invented certain new and useful Improvements in Wheel-Plows, of which the following is a specification, reference being had therein to the accompanying drawing.

This invention relates to wheel plows and has reference more particularly to the means for controlling the up and down movements of the plowing devices to respectively raise them out of action and lower them into action and govern their depth of operation in the soil.

In a certain type of wheel plow invented by me, provision is made for raising the plows out of action by power derived from the travel of the machine through the field, the frame of the machine being supported by ground wheels mounted on wheel supports movable up and down relatively to the frame, and the plowing devices being applied to the frame so that when the wheel supports are moved downwardly the frame will be elevated and will elevate the plowing devices out of action, and when the wheel supports move upwardly the plow frame will descend and lower the plows into action. In this machine the power for elevating the frame and connected plowing devices is derived from the rotation of one of the ground wheels in the travel of the machine, through the medium of a winding drum sustained by the wheel support and adapted to be clutched to the wheel thereon, and when so clutched, acting to wind on the drum a chain anchored to the machine frame and resulting in the downward movement of the support and the consequent upward movement of the frame. The control of the clutch in this machine is effected by means of a clutch operating lever pivoted between its ends and having one end connected with the clutch mechanism and its opposite end connected with a rope or cable leading forwardly from the machine in position to be operated by the attendant, a latch being connected with the lever and coöperating with a toothed segment frame in such manner that when the lever is shifted on its axis by the cable, the first part of the movement will release the parts from locked connection with the segment frame and the second part of the movement will effect connection of the clutch. In operating the mechanism to throw the power means into action to raise the plowing devices, it is only necessary for the operator to draw forwardly on the cable with a single full pull so as to unlock the parts and connect the clutch, whereupon the winding drum being thrown into action, the chain will be wound thereon and the wheel support moved downwardly and the plow frame and connecting plows elevated. In operating the parts, however, to effect the lowering of the plows from their elevated position, dependence is placed on the weight of the machine frame and plows to cause the same to descend, it not being necessary therefore in this operation to throw the clutch into action to operate the winding drum, and therefore the operator had to be careful to pull on the operating cable just enough to disengage the latch from the segment frame, but not enough to throw the clutch into action; and if care were taken to observe these precautions the parts could be operated in the proper manner, and the lowering of the plows effected without difficulty. But it was found in the operation of the machine in the field that under certain conditions of use, for instance in connection with tractors, which demanded the main part of the operator's attention at the end of the field just as the turn was about to be made, the operator would frequently pull the clutch lever too far when the plows were to be lowered, far enough not only to disengage the latch and release the parts, but also, far enough to throw the clutch into action, the result being that the winding drum would become operative and elevate the plows still higher.

It is the aim of the present invention to avoid the possibility of such improper action, and the invention consists of means coöperating with the clutch operating lever and connected parts in such manner that when the latch is engaged with the segment frame and is holding the plows elevated, the clutch operating lever will be prevented from being moved farther by the pull on the cable than is necessary to disengage the latch from the segment frame and release the parts. Consequently the operator will be relieved of any care, in operating the clutch controlling lever, to give it more or less throw, so that there will be no danger of an improper operation of the parts, and the mechanism may be actuated with certainty in effecting the lowering of the plows into action in their elevated inactive position.

Referring to the drawings:

Fig. 2 is a perspective view on an enlarged scale of the parts of the mechanism with which my invention is more directly concerned, the said parts being in the position they occupy when the plows are elevated.

Fig. 3 is a similar view showing the parts in the position they occupy when the plows are lowered.

Figure 1:
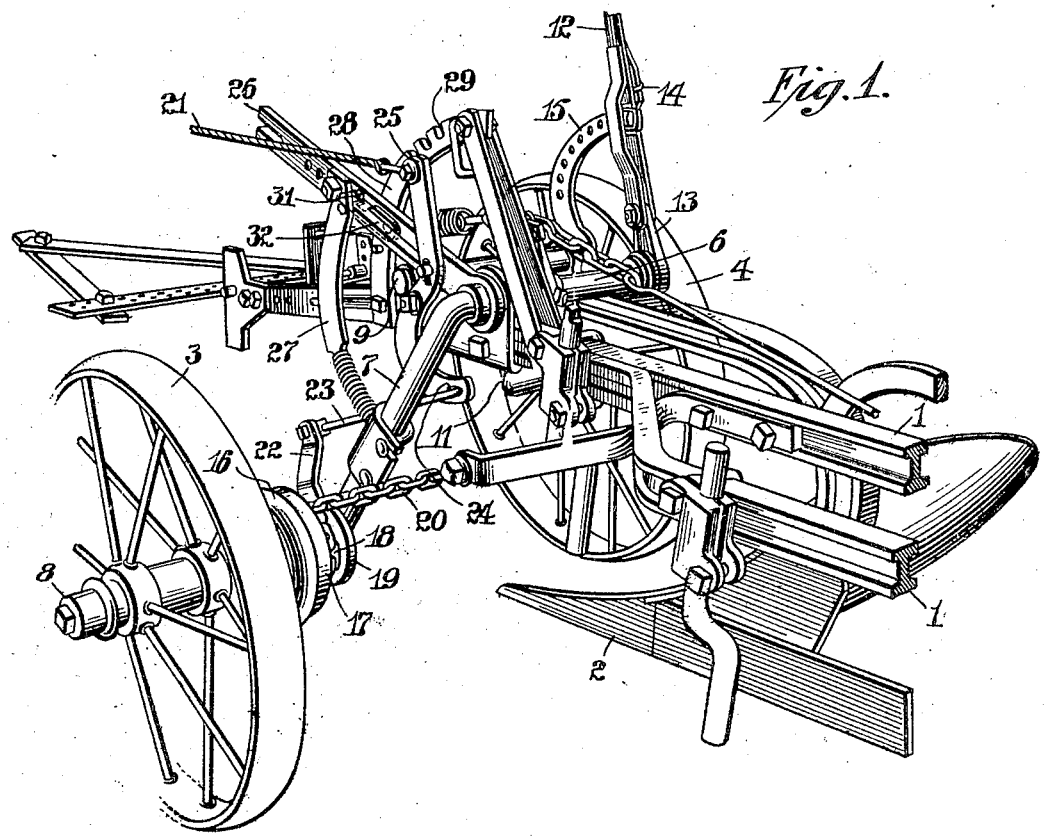
Figure 1 is a rear perspective view of the forward portion of a wheel plow having my invention embodied therein.
Figure 4:
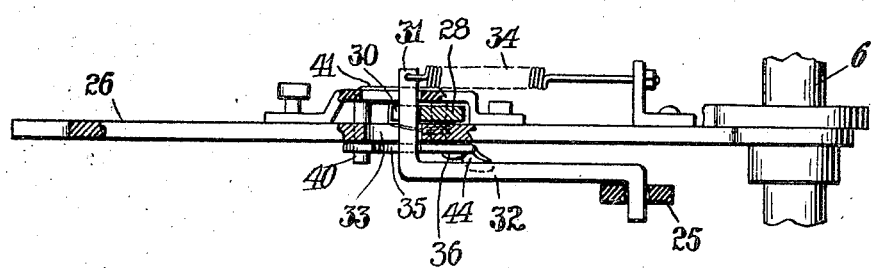
Fig. 4 is a section partly in elevation, the section being taken on the line a—a of Fig. 2.

Referring to the drawings:

1 represents a frame structure suitable for giving support to the plowing devices 2. This frame is sustained at its forward end by means of a land wheel 3 and a front furrow wheel 4, and its rear end by a rear furrow wheel 5. The land wheel is carried by a land wheel support in the form of a crank shaft comprising a horizontal inwardly extending shaft proper 6, a laterally extending crank arm 7 and an outwardly extending horizontal wrist portion 8. The shaft proper of the crank shaft is mounted to rock in bearings on the machine frame, while the land wheel is mounted for rotation on the wrist portion of the shaft, the rocking of the shaft in its bearings serving to swing the wheel up and down relatively to the frame. The front furrow wheel is carried by a furrow wheel support in the form of a crank shaft consisting of an inwardly extending horizontal shaft proper 9 mounted in bearings on the frame, a laterally extending crank arm 10 and an outwardly extending wrist portion 11, the furrow wheel being mounted for rotation on the wrist portion, and the construction being such that when the shaft is rocked, the furrow wheel will be swung up and down relatively to the frame similar to the action of the land wheel.

The two crank shafts are operatively connected together in such manner that when one is rocked, it will impart a corresponding and simultaneous rocking motion to the other, to the end that the two wheels will be moved in unison relatively to the frame in raising and lowering the plows. Any suitable and appropriate form of construction may be employed for this purpose but I have illustrated an adjustable connection between the two crank shafts which forms no part of the present invention. As shown more particularly in Fig. 1 this connection is in the form of an adjusting lever 12 pivoted at its rear end to an arm 13 fixed to the end of the land wheel crank shaft, and provided with a locking latch 14 adapted to operatively engage in any one of a number of holes in an arm 15 fixed to the crank arm of the furrow wheel crank shaft, which lever when its latch is so engaged will form a connection between the two crank shafts, by which the motion of one will be transmitted to the other.

The rocking motions of the front wheel-supports to raise and lower the plows are effected by means of power derived from the travel of the machine through the field, the said power in the present instance being taken from the land wheel by means of the mechanism now to be described. Applied to the inner end of the hub of the land wheel is an outer driving member 16 of a clutch, the inner driven member 17 of which clutch is loosely mounted on the wrist portion 8 of the land wheel crank shaft. The clutch members are provided with coöperating friction surfaces so that when the inner member is moved outwardly it will be frictionally engaged with the outer member and be driven thereby, and when moved inwardly it will be disengaged from the driving member and remain at rest. The driven member of the clutch is provided with a hub constituting a winding drum 18 within which extends a clutch actuating sleeve 19 mounted loosely on the inner end of the wrist portion of the crank shaft, the said sleeve being capable of a rotary oscillation on the wrist and capable also of an endwise shifting movement outwardly to shift the driven clutch member into engagement with the driving clutch member. As a result of the construction described, it will be understood that when the land wheel is rotating in the travel of the machine and is imparting a corresponding rotation to the driving clutch member, if the driven clutch member is shifted into frictional engagement with the other member, the driven member will be rotated by the wheel and will correspondingly rotate the winding drum. The outward movement of the driven clutch member to effect the connection of the clutch is effected by the rotary oscillation of the sleeve 19, the inner end of said sleeve being engaged with the crank arm 7 and so formed that when oscillated it will be shifted endwise outwardly. A spiral spring (not shown) is interposed between the two clutch members and acts to separate them when the clutch sleeve is operated to disconnect the clutch.

To the winding drum 18 is connected one end of a chain 20, the opposite end of which is anchored to the frame of the machine, the arrangement being such that when the drum is rotated the chain will be wound thereon and the land wheel crank shaft will be swung downwardly and to the rear, this action effecting a corresponding movement of the furrow wheel crank shaft and resulting in the elevation of the frame and plows.

The connection and disconnection of the clutch members is effected by means under the control of the operator or attendant, in the present instance the engineer of the tractor to which the plow is connected, a rope or cable 21 being extended from the clutch controlling means within reach of the engineer to enable him to raise and lower and adjust the plows while at the same time he may control the tractor. These controlling means will now be described.

On reference to Figs. 2 and 3, it will be seen that there is connected fixedly with the clutch actuating sleeve, an upwardly extending arm 22, the outer end of which is connected to a connecting rod 23 which extends rearwardly and has its inner end mounted in a slot 24 in the lower end of an upright clutch actuating lever 25. The lever 25 is pivoted between its ends to a stub lever 26, the inner end of which is mounted loosely on the shaft proper of the land wheel crank shaft. The upper end of the lever 25 has the cable 21, before alluded to, connected with it so that it may be conveniently operated by the engineer or attendant, and the construction is such that when the engineer pulls forwardly on the cable, the actuating lever 25 will be rocked on its axis and its lower end will be swung to the rear, which action will through the medium of the connecting rod 23, oscillate the clutch sleeve 19 and shift the driven clutch member into engagement with the driving clutch member, whereby the drum will be rotated from the land wheel. This action will wind up the chain and will swing the land and furrow wheels downwardly and will elevate the plows, the release of the cable permitting the clutch spring to act and separate the clutch members from each other. The stub lever 26 is connected by means of an arm 27 with the land wheel crank shaft so that in the rocking movements of the shaft the lever will be correspondingly rocked, and the stub lever coöperates with an upright segment frame 28 fixed to the machine frame. This segment frame is provided at its upper end with a number of notches 29 by means of which the stub lever may be locked to hold the wheel supports in position when the plows are down in action and is provided also with a lower notch 30 by means of which the stub lever may be locked to hold the plows elevated out of action. The stub lever is provided with a locking latch 31 coöperating with these notches, which latch is constituted by the outer laterally extending end of a latch rod 32 which extends longitudinally along the outer side of the stub lever and is pivoted at its rear end to the clutch actuating lever 25 at a point above the pivotal axis of said lever. The latch rod is guided in its endwise movements by means of a slot 33 in the stub lever in which the forward lateral end of the latch rod extends, and it is acted on by a spiral spring 34, which is connected at one end to the end of the latch and is connected at its other end to the stub lever, the said spring tending to maintain the engagement of the latch with the edge of the segment frame.

As a result of the construction described, when the stub lever is swung downwardly by the downward movement of the crank arm 7 to elevate the plows, and when the latch arrives opposite the lower notch it will enter therein and the parts will be locked with the plows raised. When, however, the parts are moved in the opposite direction to lower the plows, and when the latch arrives opposite any one of the upper notches in the segment frame, the latch will enter therein and the parts will be locked with the plows down in action.

Due to the connection of the latch rod with the clutch actuating lever, the operation of the latter by the cable will actuate the latch rod and release the stub lever from whatever position it may for the time being be locked in, the length of the slot 24 in the lower end of the clutch lever being such, in relation to such movement of the latch as is necessary to release the same, that the latch may be actuated to release the lever without necessarily actuating the clutch to throw the same into action. In the operation of the parts, therefore, a slight pull on the cable will serve to actuate the latch and release the stub lever, while a greater and full pull will serve in addition to throw the clutch into action, the latch, after the clutch has been once thrown into action and after the cable has been released, being caused by its spring to engage one of the notches in the segment frame and lock the stub lever thereto. When the parts are in this position the slot 24 in the clutch lever will permit the clutch to be disconnected by means of the clutch spring, the end of the connecting rod 23 in this movement being shifted rearwardly in the slot 24.

As a result of the construction described, it will be understood that when the plows are down in action with the crank arms extending forwardly, with the latch engaging one of the upper notches in the segment frame to lock the parts in this position and with the clutch disconnected, if it is desired to raise the plows out of action, the operator pulls forwardly on the actuating cable to rock the clutch actuating lever 25. The first part of the movement of the lever will disengage the latch from the notch in the segment frame and will release the parts, and the further movement of the lever, due to the continued and further pull on the cable, will actuate the clutch sleeve and throw the clutch into action, whereupon the motion of the land wheel being transmitted to the winding drum, the chain will be wound thereon and the crank arms will be swung downwardly and to the rear, thereby swinging the stub lever downwardly and elevating the plows. The tension on the actuating cable is maintained until the lower notch 30 of the segment frame is reached by the latch, whereupon the cord is released, which will permit the latch to enter the lower notch, and the clutch spring to act to disconnect the clutch, the result being that the plows will be held locked in an elevated position. If now the plow is to be lowered into action, of course the clutch should remain out of action, and therefore a slight pull is given the cable, sufficient only to release the latch from the notch in the segment frame. The weight of the plow frame will now act to lower the same relatively to the wheels, the crank arms in this action swinging upwardly, and the chain being unwound from the drum. It is seen, therefore, that in this latter action to lower the plows, the operator is compelled to take into account the character of the pull he exerts on the cable so as not to operate the clutch lever for its full throw. Under certain conditions of the use of the machine such care may very readily be observed by the operator, but there are other conditions where he cannot give his full attention to the operation of the parts in the manner stated, and in such conditions there is liability of the operation of the clutch lever to its full extent, which would of course result in the connection of the clutch and the further elevation of the plows instead of the plows being lowered. This may very readily happen when the plows are used in connection with tractors which demand practically the full attention of the operator when the machine is about to be turned at the end of the field. In these circumstances the operator may fail to properly determine the extent of movement to be given the clutch lever and an improper action of the parts may very readily result.

In accordance with my invention I provide means to prevent such improper operation of the parts, which means in the embodiment of the invention shown by way of example, comprises a member which operates automatically, when the latch is engaged with the lower notch of the segment frame, to become effective as a stop for said latch and limit its outward motion when the clutch lever is operated to disengage the latch from the notch, whereby the latch will be permitted to move sufficiently to disengage the notch, but will prevent the clutch lever from being moved far enough to connect the clutch. As shown more particularly in Figs. 2 and 3, this member is in the form of a detent 35 which is pivoted at its inner end as at 36 to the side of the stub lever and extends at its inner portion between said lever and the latch rod. The edge of the detent near its outer end is recessed as at 37, thereby forming a nose 38, the outer edge of which slopes outwardly as at 39. The relation of the recess and nose to the lateral latch on the end of the latch rod is such that when the detent is swung upwardly on its pivotal axis, the latch will be received in the recess and the nose will extend across the outer side of the latch, this being the effective operative position of the detent in limiting the outward movement of the latch. When the latch is engaged in the lower notch in the segment frame as shown in Fig. 2, the detent will be held by the latch with the recess free of the latch, in which position the detent will rest at its lower edge on a pin 40 projecting laterally from an arm 41 pivoted as at 42 to the segment frame and acted on by a spring 43 which tends to urge the pin upwardly against the detent. When now the operator pulls forwardly on the operating cable and rocks the clutch lever on its axis, the latch will be thrust outwardly from the notch in the segment frame, and as the latch is brought opposite the recess in the detent and disengages the notch in the segment frame, the spring pressed pin will swing the detent upwardly and will project its nose in the path of the outwardly moving latch, thereby preventing further outward movement of the latch and consequently limiting the further movement of the clutch lever. As a result of this operation, the clutch lever is permitted to be moved only sufficiently far to disengage the latch from the segment frame and not far enough to effect the connection of the clutch members. When the latch is thus disengaged, the operator maintains the tension on the cable and the detent will be held by the engagement of its nose with the latch in its operative position relatively thereto, and the weight of the plow frame and plow will cause the parts to descend and the wheel supports to be swung upwardly, in which action the stub lever will likewise swing upwardly. When the latch arrives opposite the particular one of the upper notches in the segment frame with which it is to be engaged for locking the plows down, the operator relieves the tension on the cable, whereupon latch spring 34 will draw the latch and latch rod inwardly and seat the latch in the upper notch in the segment frame. The detent in this motion will be released and caused to swing away from the latch free of the same to the position shown in Fig. 3, the clutch lever rocking on its pivotal axis with its lower slotted end moving relatively to the actuating rod 23. The detent is prevented from moving too far downwardly when thus released, by means of a finger 44 on its inner end in position to engage the side of the latch rod.

When now the plows are to be elevated out of action, the cable is drawn forwardly, thereby rocking the clutch lever on its axis and thrusting the latch outwardly from the upper notch in which it was engaged, the further pull on the cable causing the clutch lever to shift still farther so as to throw the clutch into action. The winding drum now becomes effective, and the wheel supports are swung downwardly and the plow frame and plows elevated. In this action the stub lever moves downwardly until the latch arrives opposite the lower notch, whereupon the cable is released, and the latch seats therein and locks the parts in their former elevated position as shown in Fig. 2, the detent in this action bringing up against the spring pressed pin ready to be again swung upwardly to operative position when the cable is operated to again lower the plow.

It is seen, therefore, that the mechanism constitutes automatically operating means which becomes effective when the clutch lever and connected latch are operated to release the parts from their locked position with the plows elevated, to permit them to be lowered, and acting when effective to prevent the latch lever from being shifted far enough to connect the clutch member.

In the foregoing description and accompanying drawings, I have set forth my invention in the form and construction which I prefer to adopt and which in practice has been found to answer to a satisfactory degree the ends and advantages to be attained. It will be manifest to the skilled mechanic, however, that various changes may be made without departing from the limits of my invention, provided the operation will be substantially as indicated above. Further, it will be understood that the invention is not limited to any particular form or construction of the parts except as hereinafter specified in the claims.

Having thus described my invention, what I claim is:

1. In a wheeled plow, the combination of a frame, ground wheels supporting the same, plowing devices carried by the frame and movable up and down out of and into action respectively, wheel operated power mechanism for raising the plows, a releasable locking device for holding the plows respectively in raised and lowered position, an actuating member for throwing the power mechanism into action, said actuating member being operatively connected with the locking device to release the same, a stop independent of the actuating member and coöperating with the locking device, means for preventing the power mechanism from being thrown into action in the operation of the actuating member to unlock the plows from their raised position.

2. In a wheeled plow, the combination of a frame, ground wheels supporting the same, plowing devices carried by the frame and movable up and down out of and into action respectively, wheel operated power mechanism for raising the plows, a releasable locking latch engaging the frame and acting to hold the plows respectively in raised and lowered positions, an actuating member for throwing the power mechanism into action, said actuating member being operatively connected with the locking latch to release the same before the power mechanism becomes active, and a stop member independent of the actuating member and coöperating with the locking device to prevent the power mechanism from being thrown into action in the operation of the actuating member to unlock the plows from their raised position.

3. In a wheeled plow, the combination of a frame, ground wheels supporting the same, plowing devices carried by the frame and movable up and down out of and into action respectively, wheel operated power mechanism for raising the plows, a releasable locking latch engaging the frame to hold the plows in raised and lowered positions respectively, a pivoted actuating lever for throwing the power mechanism into action, said actuating lever being pivotally connected with the locking latch and operating when rocked on its pivot to release the latch and throw the power mechanism into action, a detent movable in the path of the latch to limit its motion, said detent being normally out of the path of the latch, and automatic means controlled by the releasing movement of the latch for moving said detent in the path of the same when the actuating lever is operated to unlock the plows from their raised position; whereby the actuating lever will be prevented from moving sufficiently far to throw the power mechanism into action when the lever is operated to release the plows from their raised position.

4. In a wheeled plow, the combination of a frame, ground wheels supporting the same, plowing devices carried by the frame and movable up and down out of action and into action respectively, wheel operated power mechanism for raising the plows, a releasable locking device for holding the plows in raised and lowered positions respectively, an actuating member for throwing the power mechanism into action, said actuating member being operatively connected with the locking device, a stop device normally out of the path of the locking device and movable into said path to limit the motion of the locking device, and automatic means controlled by the releasing movement of the actuating member, for moving the stop device in the path of the locking device when the actuating member is operated to unlock the plows from their raised position; whereby the actuating member will be prevented from moving sufficiently far to throw the power mechanism into action when the member is operated to release the plows from their raised position.

In testimony whereof I have affixed my signature hereto.

HARRY S. DICKINSON.